United States Patent
Esch et al.

[11] Patent Number: 5,930,992
[45] Date of Patent: Aug. 3, 1999

[54] PROCESS FOR CONTROLLING A MULTIPLE CYLINDER INTERNAL COMBUSTION ENGINE IN THE COLD START AND WARMING UP PHASES

[75] Inventors: Thomas Esch; Martin Pischinger; Wolfgang Salber, all of Aachen, Germany

[73] Assignee: Fev Motorentechnik GmbH & Co. Kommanditgesellschaft, Aachen, Germany

[21] Appl. No.: 08/696,877

[22] PCT Filed: Dec. 15, 1995

[86] PCT No.: PCT/EP95/04969

§ 371 Date: Oct. 18, 1996

§ 102(e) Date: Oct. 18, 1996

[87] PCT Pub. No.: WO96/19646

PCT Pub. Date: Jun. 27, 1996

[30] Foreign Application Priority Data

Dec. 21, 1994 [DE] Germany .............................. 44 45 779

[51] Int. Cl.⁶ ............................... F01N 3/20; F01N 3/30; F01L 9/04
[52] U.S. Cl. .......................... 60/274; 123/90.11; 123/481; 123/198 F; 60/284; 60/285
[58] Field of Search .............................. 60/274, 284, 285, 60/307; 123/198 F, 90.11, 481

[56] References Cited

U.S. PATENT DOCUMENTS

| | | |
|---|---|---|
| 3,800,772 | 4/1974 | Gospodar .................................. 60/284 |
| 3,916,622 | 11/1975 | Gospodar .................................. 60/285 |
| 4,007,590 | 2/1977 | Nagai et al. .............................. 60/284 |
| 4,165,610 | 8/1979 | Iizuka et al. ............................. 60/284 |
| 4,256,074 | 3/1981 | Sugasawa et al. ......................... 60/285 |
| 4,700,684 | 10/1987 | Pischinger et al. ................. 123/90.11 |
| 4,995,351 | 2/1991 | Ohkubo et al. ...................... 123/90.11 |
| 5,271,229 | 12/1993 | Clarke et al. ........................ 123/90.11 |
| 5,284,116 | 2/1994 | Richeson, Jr. ....................... 123/90.11 |

FOREIGN PATENT DOCUMENTS

| | | |
|---|---|---|
| 0376714 | 7/1990 | European Pat. Off. . |
| 2749742 | 12/1978 | Germany . |
| 4029672 | 4/1992 | Germany . |
| 3050380 | 3/1991 | Japan . |
| 4159428 | 6/1992 | Japan . |
| 1493308 | 11/1977 | United Kingdom . |

*Primary Examiner*—Willis R. Wolfe
*Attorney, Agent, or Firm*—Venable; George H. Spencer; Catherine M. Voorhees

[57] ABSTRACT

A process is disclosed for controlling a multiple cylinder internal combustion engine in which exhaust gases undergo subsequent treatment. To ensure a gaseous exchange, air is supplied to the individual cylinders through inlet devices and exhaust gases are discharged through outlet or exhaust devices. The inlet and outlet devices are independently driven but their opening and closing times may be synchronized. Beginning in the cold start phase until the warming up phase, fuel is supplied to only part of the cylinders that act as an engine and the supply of fuel to the other cylinders is cut off. The other cylinders work then as compressors. The air volume heated in these cylinders by compression flows through the outlet device into the exhaust gas system and reacts with the exhaust gases.

5 Claims, 3 Drawing Sheets

PROCESS FOR CONTROLLING A MULTIPLE CYLINDER INTERNAL COMBUSTION ENGINE IN THE COLD START AND WARMING UP PHASES

BACKGROUND OF THE INVENTION

Due to the severe environmental impact of exhaust gas emissions of internal combustion engines, the demands with respect to the emission behavior of modern internal combustion engines are becoming ever more stringent. In addition to the reduction of exhaust gas emissions through secondary measures such as, for example, the use of catalytic converters, it is also necessary to markedly reduce the untreated primary pollutant emission produced by the engine.

In this context, the pollutant behavior is influenced considerably, on the one hand, by the normal operation with rapid changes in engine rpm's and changes of the engine load and by the cold engine operation. According to the test cycles for the inspection of engines prescribed by law, the first 60 to 80 seconds of the starting phase of a cold engine are decisive for staying below the exhaust emission limits. Up to 80% of the unburnt hydrocarbons emitted during the entire test cycle are released during this time period at an engine starting temperature of 25°. Cold intake pipe walls and combustion chamber walls, the higher friction loss that must be overcome, and the catalytic converter that has not yet reached operating temperatures and in which the conversion rates in the cold operating state are still very low are only a few of the factors which contribute to a drastic increase in the hydrocarbon emission and the emission of carbon monoxide. At ambient temperatures below 0° C., a further marked increase in the pollutant emission occurs during the cold start and warming-up phases.

A number of options for the reduction of pollutant emissions have already been implemented which largely only become effective, however, when the engine has reached operating temperatures. In addition to structural measures such as, for example, cylinder head and combustion chamber design, position of the spark plugs and of the injection nozzles, number of valves, displacement, stroke-bore ratio, compression ratio, intake port and exhaust port design, the generation of primary pollutants can also be influenced through operative measures. For this purpose, factors lend themselves such as carburetion, ignition moment and injection moment, control times, internal recirculation of residual exhaust gas through control time changes, external recirculation of exhaust gas, cutoff of the fuel supply during the overrun phases, and the use of a phase change material device for the utilization of the "waste heat" of the engine. The hydrocarbon emissions can also be reduced by engine-external measures in the exhaust gas region such as, for example, an after treatment of the exhaust gas through catalytic converter systems, insulation of exhaust manifold and exhaust gas system as well as the use of thermal reactors. The engine-external injection of secondary air during the cold start and warming-up phases promotes the secondary reaction of unburnt hydrocarbons and carbon monoxides in the exhaust gas system and additionally results in a more rapid heating up of the catalytic converter due to the heat released during oxidation. In conventional engines, this takes place by way of an additional secondary air pump which must be driven by an electric motor or by the internal combustion engine itself.

SUMMARY OF THE INVENTION

It is now the object of the invention to propose a process for controlling a multiple-cylinder internal combustion engine of this type for the cold start and warming-up phase, which process results in a reduction of the pollutant emissions specifically during this operating phase of an engine.

According to the invention, this object is accomplished by a process for controlling a multiple-cylinder internal combustion engine with internal combustion and after treatment of the exhaust gases, wherein the gas exchange in the individual cylinders takes place through intake devices, at least for the air, and exhaust devices for the exhaust gas, which devices can be actuated independently of one another but with opening times and closing times that are coordinated with one another, wherein, beginning in the cold start phase up into the warming-up phase, only a portion of the cylinders is supplied with fresh fuel mixture, which cylinders then function as an engine, and the supply of fresh fuel mixture to the other portion of the cylinders is cut off, which cylinders then function as a compressor, and the amount of air heated in these cylinders by the compression process is admitted through the exhaust device into the exhaust gas system for the secondary reaction of the exhaust gases. Thus, it is possible to have one or a plurality of cylinders of the engine work as a "hot secondary air pump" without booster sets and to use the hot air made available by this process for the secondary reaction of the unburnt hydrocarbons and carbon monoxides in the exhaust gas system. This becomes possible in that, as a function of the control times of the intake device and of the exhaust device, a metered air amount can be admitted into the exhaust gas system as needed through intake and exhaust devices which can be actuated independently of one another but in coordination with one another and with it being possible to cut off the injection to the individual cylinders. This can take place during every crankshaft rotation as well as after several rotations. Additionally, the high temperature level of the compressed air can be utilized for the more rapid heating of the catalytic converter and the secondary reaction in the exhaust gas system can be promoted further if the exhaust valve in the region of the final compression phase opens early.

Another advantage is that the cylinders functioning as an engine, which cylinders must drive the cylinder or the cylinders functioning as a compressor, carry a higher load so that here a more rapid heating of the regions in the proximity of the combustion chamber as well as a more rapid heating of the exhaust gas system takes place through higher exhaust gas temperatures. In a particularly useful embodiment of the invention, it is provided here that the fuel supply to an individual cylinders is changed over alternatingly. By way of the alternating use of the cylinders as an "engine" and as an "air pump", all cylinders are successively integrated into the engine operation during this phase and are heated according to the higher thermal load, and, thus, a cooling of the cylinder walls surrounding the combustion chamber is prevented. Therewith, the risk of the flame going out too early on the cold combustion chamber walls is counteracted and the hydrocarbon emissions can be reduced in this manner. With an operating mode of this type, the costs of and the installation space for an additional secondary air pump are saved. The fuel can be injected into the air intake channel or directly into the cylinder.

In an embodiment of the invention it is provided that, if starting takes place via an auxiliary drive, the intake devices and/or the exhaust devices are kept open during the first revolutions. Thus, the starting power that has to be generated by the auxiliary unit, usually a starter, becomes markedly smaller. This results in smaller auxiliary units for the starting process which are more advantageous in terms of costs and weight and for which the energy that must be provided and thus the size of the battery is then also reduced.

A further advantageous embodiment of the process according to the invention provides that, in support of the processing of the fuel-air mixture, the intake devices are opened while being respectively adapted in the direction "late". This prevents the problem of inferior conditions for the carburetion in internal combustion engines with external carburetion during the cold start and warming-up phases. After all, the low temperature level of the cylinder charge and of the intake channel walls markedly impairs the atomization quality of the carburetor. By means of the embodiment proposed by the invention, the carburetion process can now be improved considerably by way of a late opening of the intake devices. By way of an unconventional "late intake opens", the intake device opens only when the piston approaches the lower dead center during the downward movement. During opening of the intake device, a pronounced acceleration of the air column commences with the already injected fuel because of the then prevailing vacuum in the combustion chamber. The large relative movement between fuel and air as well as the increased movement of the mixture in the combustion chamber promote the processing of the mixture and result in a markedly improved combustion. During the further phase of the engine warm-up, a conventional operating point-dependent optimization of the residual exhaust gas portion can then improve the warming-up process by a combinatorial system of the valve control parameters "intake opens" and "exhaust closes". Through an "early exhaust opens", the temperature in the exhaust gas system is additionally increased through the outflowing hot exhaust gases. By adapting the control time "exhaust opens", the secondary reactions in the exhaust gas system as well as the heating-up phase for the catalytic converter can be shortened.

BRIEF DESCRIPTION OF THE DRAWINGS

The invention is explained in greater detail by means of schematic drawings of an embodiment in which.

DETAILED DESCRIPTION OF THE INVENTION

Figure 1:
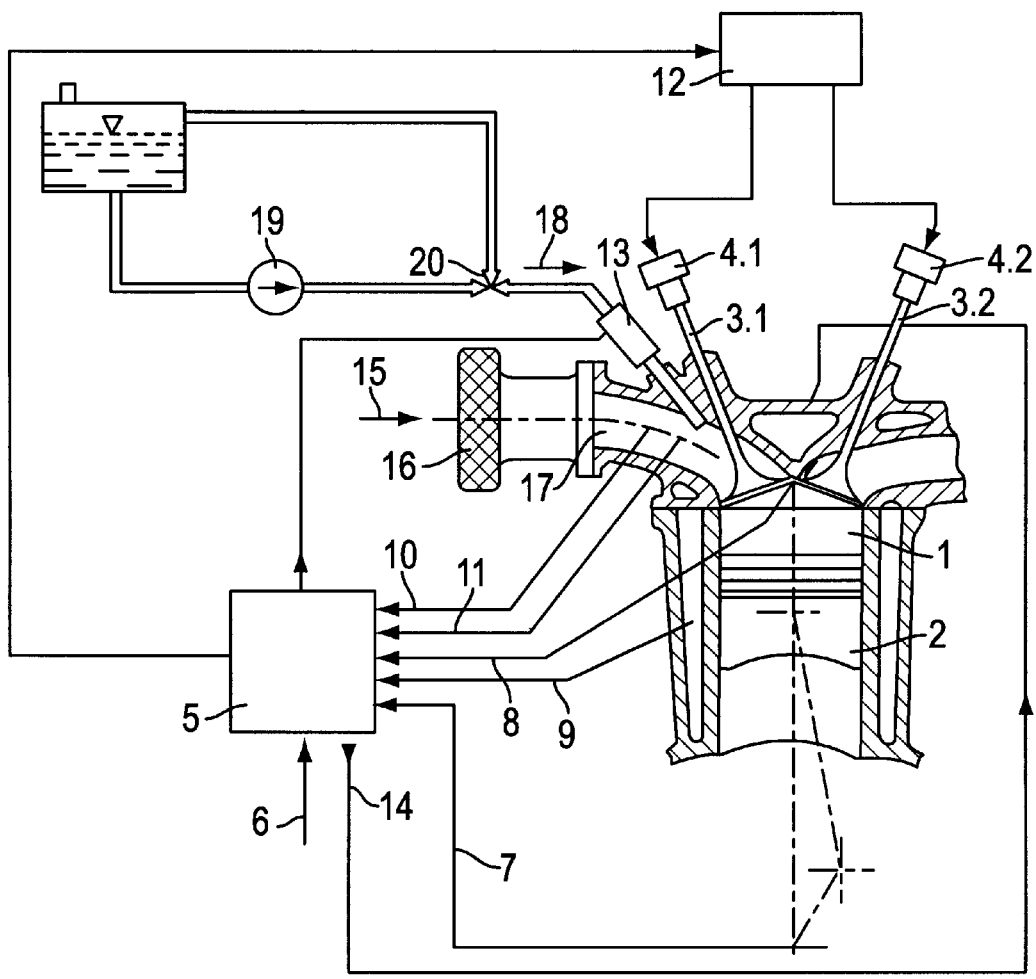
FIG. 1 is a wiring and control diagram for a cylinder of a multiple-cylinder internal combustion engine.

FIG. 1 is a schematic illustration of a partial section through the combustion chamber of a cylinder of a multiple-cylinder internal combustion engine. A piston 2 moves in the cylinder tube 1. An intake device 3.1 and an exhaust device 3.2 are provided in the cylinder head, both devices being respectively provided with an actuating device 4.1 and an actuating device 4.2 by means of which the intake device or exhaust device can be respectively opened and closed. The actuating devices, which may be configured, for example, as actuating devices that are operable electromagnetically, are connected to a control logic 5 in which are stored characteristic engine diagrams for different operating states in the form of control times for the intake and exhaust devices as well as for the fuel injection and the ignition. These data are called up based on the control input 6, the rpm information 7, the engine temperature 8, the cooling water temperature 9 of the pressure 10 and the temperature 11 of the combustion air, and they are supplied to an amplifier stage 12 for the actuation of the intake and exhaust devices, the injection nozzle 13 and the ignition 14 corresponding to the engine cycle. This generates an air mass flow 15 through the filter 16 in the throttle-free intake pipe 17 and the fuel flow 18 from the fuel tank via the pump 19 and the pressure control valve 20. The control logic 5 now has an engine characteristic diagram "cold start phase" which is designed such that, during the cold start phase, the fuel supply to individual cylinders can be switched off and the control times of the intake device 3.1 and of the exhaust device 3.2 can be predetermined while deviating from the normal operating control times.

Figure 2:
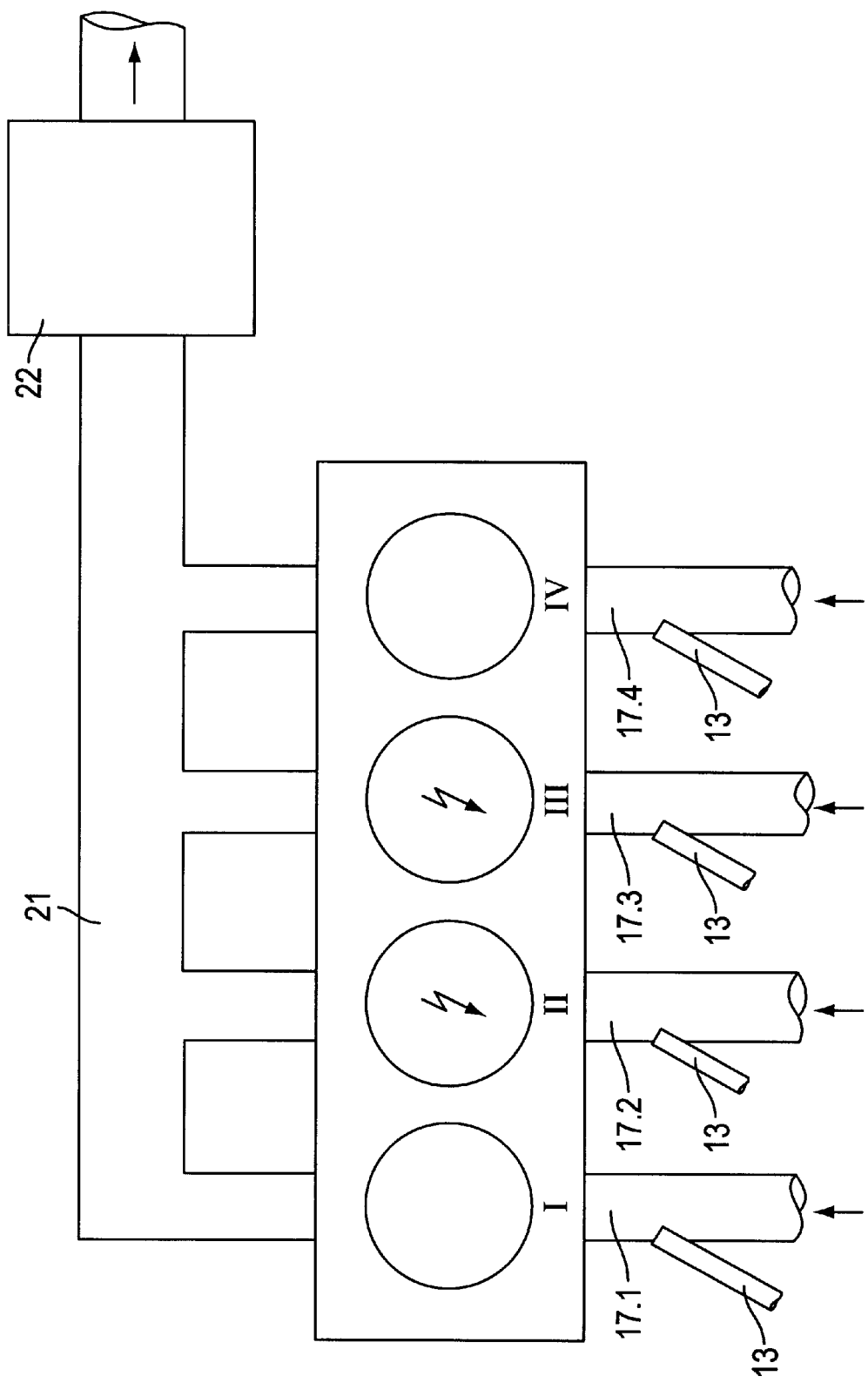
FIG. 2 is a flow diagram.

The control during this cold start phase and the subsequent warming-up phase is explained in greater detail in FIG. 2 by way of a four-cylinder engine. On the suction side, the individual cylinders I, II, III and IV are provided with intake pipes 17.1, 17.2, 17.3 and 17.4, respectively, into which merges a corresponding injection nozzle 13. The hot exhaust gases leaving the individual cylinders are carried away via an exhaust pipe 21 in which a catalytic converter 22 is arranged.

During a cold start of this internal combustion engine, the intake devices 3.1 as well as the exhaust devices 3.2 to all cylinders are first kept open via the control logic 5 so that the engine can be set rotating via the electric starter by means of a small force expenditure. After the detection of a predetermined minimum rpm, the intake devices and the exhaust devices of the individual cylinders are put into operation in conformity with the stroke; but during this process, fuel is only injected into the intake pipes 17.2 and 17.3 to the cylinders II and III, and the ignition is added according to the working cycle so that only the cylinders II and III function as engine. The cylinders I and IV only take in air which is compressed according to the working cycle and heated during this process. Accordingly, hot exhaust gas enters the exhaust gas pipe 21 from the cylinders II and III functioning as an engine in accordance with the working cycles, and hot air enters the exhaust gas pipe 21 from the cylinders I and IV functioning as a compressor. Since cylinders II and III must also do the work of the compressor of cylinders I and IV, they are more heavily charged because of the work that is to be performed so that this results in an exhaust gas that not only is hotter but contains a high portion of unburnt hydrocarbons and of carbon monoxides during the first working cycles because of the unfavorable temperature conditions. But since hot air enters the exhaust gas pipe from cylinders I and IV at the same time, the catalytic converter 22 is heated up faster due to the reaction heat of the secondary reaction, and the hydrocarbon and carbon monoxide emission is reduced. The higher exhaust gas temperatures cause the necessary secondary reactions for the decomposition of the unburnt hydrocarbons as well as of the carbon monoxide to start much earlier.

Because of the fact that the intake devices and the exhaust devices of the individual cylinders can be actuated independently of each other, the switching can now be effected via the control logic 5 during this first starting phase in such a manner that the cylinders II and III do not exclusively function as an engine and the cylinders I and IV as a compressor, but that the cylinders respectively function alternately as an engine or a compressor. This then accomplishes that all cylinders reach their operating temperature much faster and that, ultimately, the pollutant emission during the starting phase is reduced because the entire system is heated up much more quickly.

Figure 3:
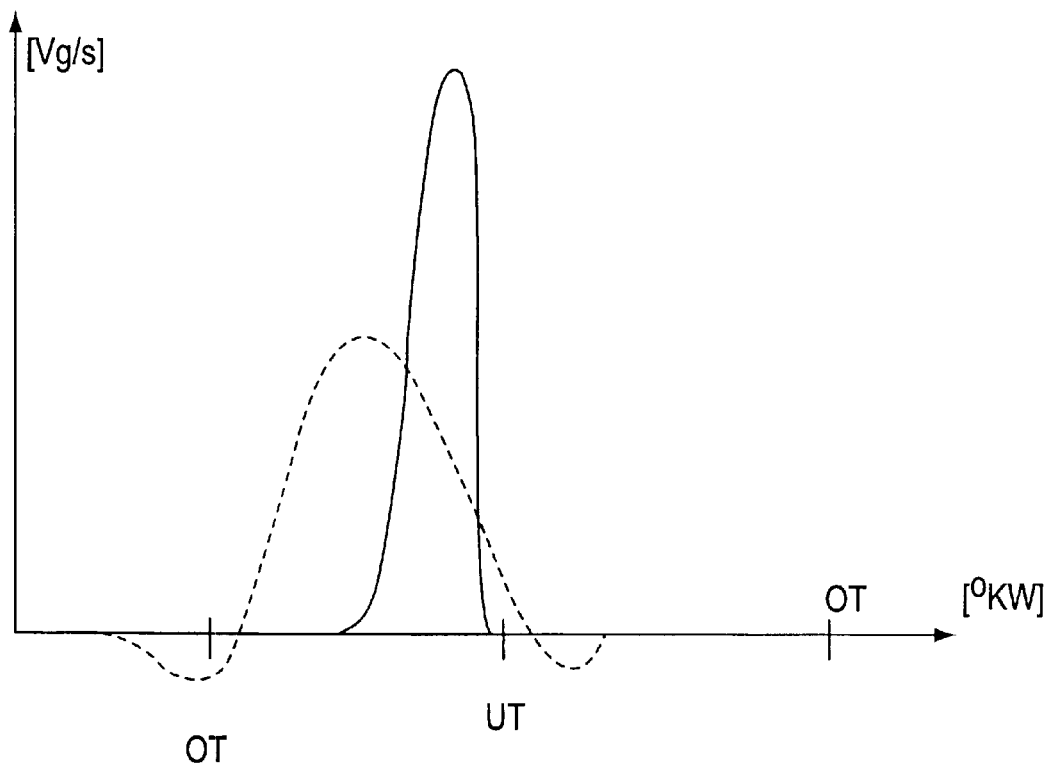
FIG. 3 is a mass flow diagram for a late opening intake device.

Since the individual intake and exhaust devices can be actuated in a variable manner, it is also possible for the cylinders that respectively work as an engine to improve the carburetion even in the cold state. FIG. 3 illustrates the mass flow through an intake device as a function of the crank angle. The dashed line shows the mass flow for a conventional throttle control. If, in line with the design of the process according to the invention, the intake device 3.1 is respectively opened when the piston approaches the lower dead center position during the downward motion, a very considerable vacuum is created in the cylinder so that the amount of air to be taken in must flow into the combustion chamber within a short time, i. e., at a high speed, so that a considerable swirl takes place. The associated mass flow for this specific actuation of the intake device is illustrated schematically in FIG. 3 with an unbroken line in comparison to the normal throttle control.

Figure 4:
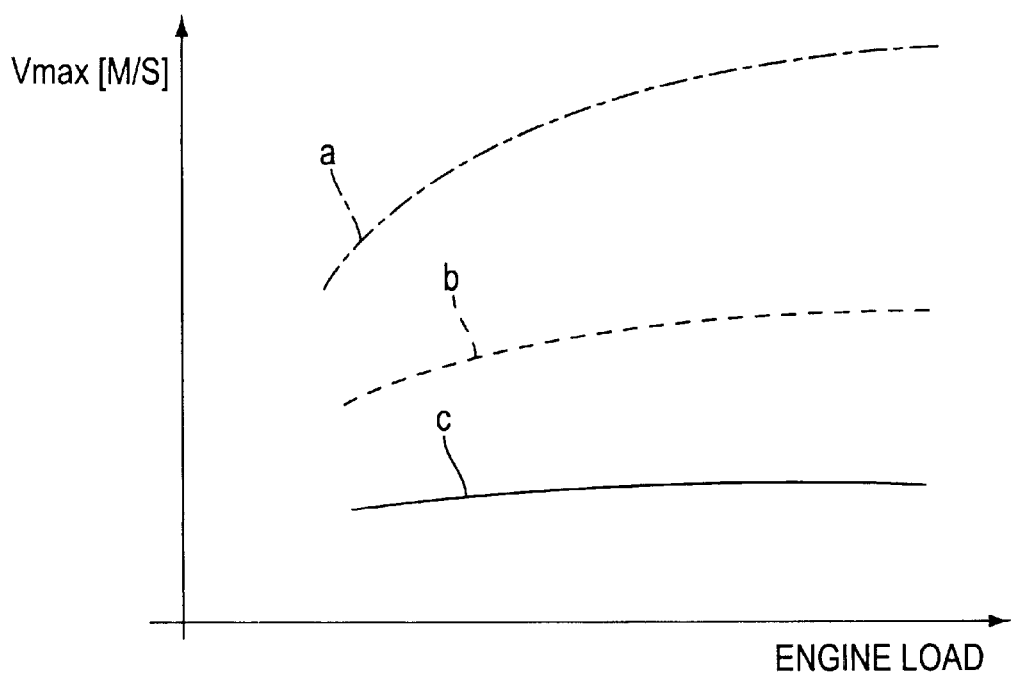
FIG. 4 illustrates the inflow rate of the air into a cylinder having two intake devices which can be actuated independently of one another.

Furthermore, starting from the cold start phase up to the normal operating phase, FIG. 4 illustrates, for different operating states, the introduction speed of the fuel-air mixture into a combustion chamber of an engine having two intake devices per cylinder. Again, the intake devices can be actuated independently of one another, with it being possible that at least one intake device can work with two different strokes.

During engine start-up, respectively one intake device is closed and the other intake device is operated with a reduced stroke for the cylinders operating in the engine mode. This then results in an intake speed for the fuel-air mixture as a function of the engine load as is indicated schematically by the curve a. As the heating up of the engine progresses and based on the predetermination of the control logic 5, the actuating device 4 of the working intake device 3 is changed over to full stroke so that, based on the larger cross section, the inflow speed is reduced, as is shown schematically in curve b. As soon as the engine has reached its operating temperature, the second intake device, which was kept closed until now, can then also be operated with its full stroke as a function of the operating point so that this results in the introduction speed of the fuel-air mixture into the combustion chamber indicated schematically by curve c. Via the control logic 5, the moment "intake opens" will also be adapted to the operating point in accordance with the changing operating data of the engine during the warming-up phase. In an internal combustion engine having two intake devices, as described above, the moment "intake opens" may but must not be shifted in the manner described by FIG. 3.

While the smooth running is diminished in a four-cylinder engine due to the possible actuation of respectively only one cylinder in the pumping mode, engines having a greater number of cylinders can be actuated such that, apart from a change from engine mode to pumping mode of the respective cylinders, a continuous addition of cylinders in the pure engine mode is also possible selectively and adapted to the operating point. The amount of air pumped in the pumping mode can be further adjusted via the number of cylinders functioning as pump and/or via the control of the intake times of the intake devices. The state of aggregation of the pressure temperature of the air that is released into the exhaust gas system can be influenced via a corresponding actuation of the exhaust device.

As an actuating device for the independent actuation of the intake and exhaust devices, the use of electromagnetic actuating devices is particularly advantageous, as known, for example, from DE-A-30 24 109. As long as the two solenoids are deenergized, the intake devices are kept open via the associated armature in a mean position between an opener and closer coil via two spring elements acting counter to one another. During operation, the armature then oscillates back and forth between the opener and closer coil. This means that the control time can be predetermined exclusively by the control logic 5 in a manner independent of the crank angle via the corresponding actuation of the excitation currents to the individual coils. Thus, it is also possible to keep the intake device and the exhaust device open for all cylinders via an auxiliary unit while the engine is still turning, just as it is possible to coordinate the opening and closing times of the intake devices and of the exhaust devices with one another in any desired combinatorial system depending on the operation. As the heating progresses, it is also possible therewith to transition into the operating phase from the above-described actuation process for the cold start phase via the control logic 5 and the characteristic engine diagrams stored therein, in which operating phase the intake devices and the exhaust devices can be actuated in a manner in which they are load-dependent with respect to their control times and adapted to one another.

We claim:

1. A process for controlling a multi-cylinder internal-combustion engine with internal combustion and subsequent treatment of exhaust gases, wherein the engine has a plurality of individual cylinders in which gas exchange occurs, each cylinder having an intake device for introducing air into the cylinder and an exhaust device for removing exhaust gas from the cylinder, and an engine control which actuates the intake and exhaust devices independently of one another but with opening times and closing times that are coordinated with one another, wherein the process, beginning in the cold start phase up to the warming-up phase, comprises the steps of:

supplying only a portion of the cylinders with fuel, the fuel-supplied cylinders operating as an engine;

cutting off the supply of fuel to the other portion of the cylinders so that such cylinders operate as compressors;

introducing air heated in the cylinders operating as compressors into the exhaust gas system by an adaptable control of the exhaust system, said introduced air being one of changeable quantity, changeable pressure, and changeable temperature for the secondary reaction of the exhaust gases; and opening the intake devices of the cylinders that are operating as an engine late for improving the fuel/air mixture.

2. A process according to claim 1, wherein the fuel supply and the ignition to the individual cylinders is changed over alternately.

3. A process according to claim 1, wherein, during startup via an auxiliary drive, at least one of the intake devices and the exhaust devices is kept open during the first revolutions.

4. A process according claim 1, wherein, in support of the processing of the fuel-air mixture, the intake devices are opened while being respectively adapted in the direction "late".

5. A process according to claim 1, wherein in the cold start and warming-up phases the passage cross sections of at least one of the intake devices and the exhaust devices are reduced.

* * * * *